United States Patent [19]

Hwang

[11] Patent Number: 5,473,305
[45] Date of Patent: Dec. 5, 1995

[54] AUTO SECURITY SYSTEM WITH TWO-STAGE DISARMING

[76] Inventor: Shih M. Hwang, 1F., 10, Lane 31, Chung Teh St., Taipei, Taiwan

[21] Appl. No.: 267,547

[22] Filed: Jun. 29, 1994

[51] Int. Cl.$^6$ .................................................. B60R 25/10
[52] U.S. Cl. ........................ 340/426; 307/10.2; 180/287
[58] Field of Search ................................... 340/426, 428, 340/429, 430, 825.31, 825.32, 825.69, 825.72; 307/10.2, 10.3, 10.4; 180/287

[56] References Cited

U.S. PATENT DOCUMENTS

| | | | |
|---|---|---|---|
| 3,464,060 | 8/1969 | Arditti | 340/426 |
| 3,873,966 | 3/1975 | Tauner | 340/426 |
| 4,494,114 | 1/1985 | Kaish | 340/426 |
| 4,794,368 | 12/1988 | Grossheim et al. | 340/426 |
| 4,996,515 | 2/1991 | Schaffer et al. | 340/426 |
| 5,113,182 | 5/1992 | Suman et al. | 340/426 |
| 5,315,285 | 5/1994 | Nykerk | 340/426 |

Primary Examiner—Brent A. Swarthout
Assistant Examiner—Nina Ting
Attorney, Agent, or Firm—Bacon & Thomas

[57] ABSTRACT

A vehicle alarm system with two-stage disarming consists of a remote control unit, a receiver-decoder unit, a Central Processing Unit (CPU). When the alarm system is armed, the CPU continues to monitor the signals transmitted from the receiver-decoder unit. If no attack is made on the vehicle or no triggering signal is detected by the alarm system, pressing the remote control unit one time will disarm the alarm. When a triggering signal is detected, the siren will sound immediately and the signal lights will flash continuously. To turn off the siren and signal lights, the remote control unit can be pressed one time while the alarm system is continuously and fully armed. If the burglar goes on stealing the vehicle, the siren will sound and the parking lights will flash again as well as that the engine start is disabled. Such full protection remains until the car owner comes back to press the remote control unit twice to deactivate, the alarm.

1 Claim, 3 Drawing Sheets

AUTO SECURITY SYSTEM WITH TWO-STAGE DISARMING

BACKGROUND OF THE INVENTION (a) Field of the Invention

The present invention relates to an automobile alarm system with two-stage disarming. More specifically, this invention is for securing a car when it is temporarily disarmed, while the car owner is not present.

(b) Description of the Prior Art

An automobile is a means of transportation in our modern life, and the sales figures for automobiles rapidly increases every year. As the demand for automobiles increases, the rate of stolen cars remains high, which makes car alarm system very demanding. At the present stage, the available auto alarm systems can instantly trigger the siren and/or signal lights if an alarm system is activated. When this instance happens often or repeatedly, which may or may not be an attempt from a burglar or an intruder, the vehicle owner can only disarm, or deactivate, the entire alarm system, leaving the burglar a great opportunity to burgle or steal the vehicle.

In addition, the loud noise from the siren when an alarm system is activated disturbs the neighbors, especially at night. This loud noise sometimes annoys the car owner also, so that even he may want to deactivate the siren by a remote unit. However, at the same time the alarm system is also deactivated. Therefore, an unavoidable period of insecurity occurs once the alarm system is disarmed, while the owner is within sight of his vehicle but far away from it. This invention rectifies the aforesaid drawbacks of alarm design. Following repeated tests and experiments, a vehicle alarm system with two-stage disarming is herein introduced.

SUMMARY OF THE INVENTION

The main objective of this invention is to provide an alarm system with two-stage disarming, which secures the vehicle when it is disarmed while the owner is within sight of but far away from the vehicle. When the alarm system is triggered, first of all, a remote unit can be pressed one time to turn off the siren and signal lights only while the alarm system remains fully armed. This means that the siren and signal lights can still be activated if the alarm system is triggered thereafter. If the burglar goes on stealing the vehicle, the siren will sound and the parking lights will flash again as well as that the engine start is disabled. Such full protection remains until the car owner comes back to press the remote control unit twice to deactivate the alarm.

This newly invented alarm system with two-stage disarming consists of a remote control unit, a receiver-decoder unit, a central processing unit (CPU), and an amplifier. When the alarm system is armed, the CPU control unit continues to monitor the signals transmitted from the receiver-decoder unit. If no attack is made to the vehicle or no triggering signal is detected by the alarm system, pressing the remote control unit one time will disarm the alarm. And, once the remote control unit is pressed, a signal will be transmitted from the remote control unit to the receiver-decoder unit, which decodes the signal and sends it to the CPU.

However, when a triggering signal is detected, the siren will sound loudly and immediately and the signal lights will flash continuously in order to catch people's attention nearby and scare off any intruder. To turn off the siren and signal lights, the car owner can press the remote control unit one time while the alarm system is continuously and fully armed. But if the burglar goes on stealing the vehicle and the triggering signals are detected, the siren will sound and the parking lights will flash again as well as the engine starter is disabled, i.e. the alarm system is still fully armed even the vehicle is intruded several times. Such full protection will remain until the car owner press the remote control unit twice to deactivate the alarm system. This process ensures that the invented device will prevent a vehicle from being stolen, especially right after the siren and the signal lights are turned off. The above description indicates that the invented device is new, and its structure has not been revealed in any publication or to the public. And, the invented device carries more features than the conventional ones. Thus, a claim is made in compliance with the law.

Although the invention has been described in its preferred form with a certain degree of particularity, it is understood that the present disclosure of the preferred form has been made only by way of an example and numerous changes in the details of construction, and the combination and arrangement of parts may be resorted to without departing from the spirit and the scope of the invention as hereinafter claimed. It is intended that the patent shall cover, by suitable expressions in the appended claims, whatever features of patentable novelty exists in the invention disclosed.

THE BRIEF DESCRIPTION OF THE DRAWINGS

DETAILED DESCRIPTION OF THE PREFERRED EMBODIMENT

Figure 1:
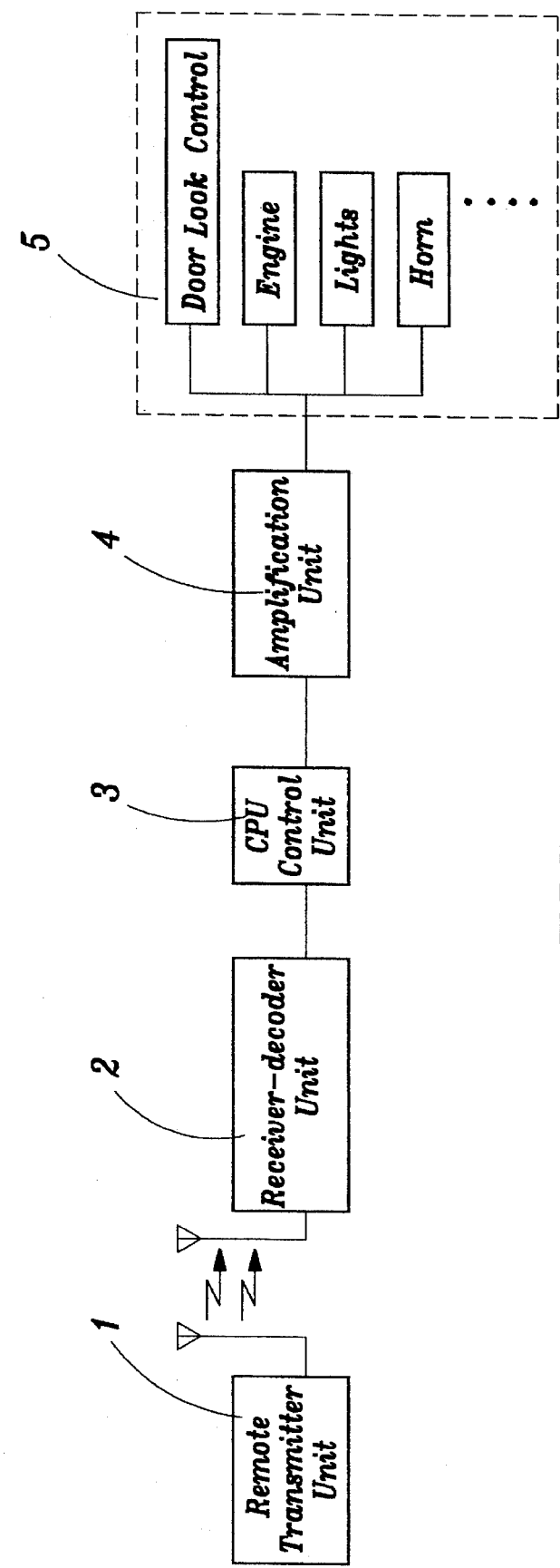
FIG. 1 is a block diagram of the present invention.

The block diagram of the alarm system with the two-stage disarming (as shown in FIG. 1) includes (1) a remote control unit, (2) a receiver-decoder unit, (3) a CPU(Central Processing Unit), and (4) an amplifier. The remote control unit (1) is used to arm and disarm the alarm system and to turn off the siren and signal lights from a remote location. The receiver-decoder unit (2) is used to receive the signals from the remote control unit (1) and to decode such signals for the CPU (3) for a further processing. The CPU (3) controls the overall operation of the alarm system, which includes the locking and unlocking of the doors and disabling of the engine starter, the siren, and the signal lights. The amplifier (4) is used to amplify the control signals from the CPU (3). These control signals will be respectively sent to the individual devices of the vehicle for controlling purposes.

Figure 2:
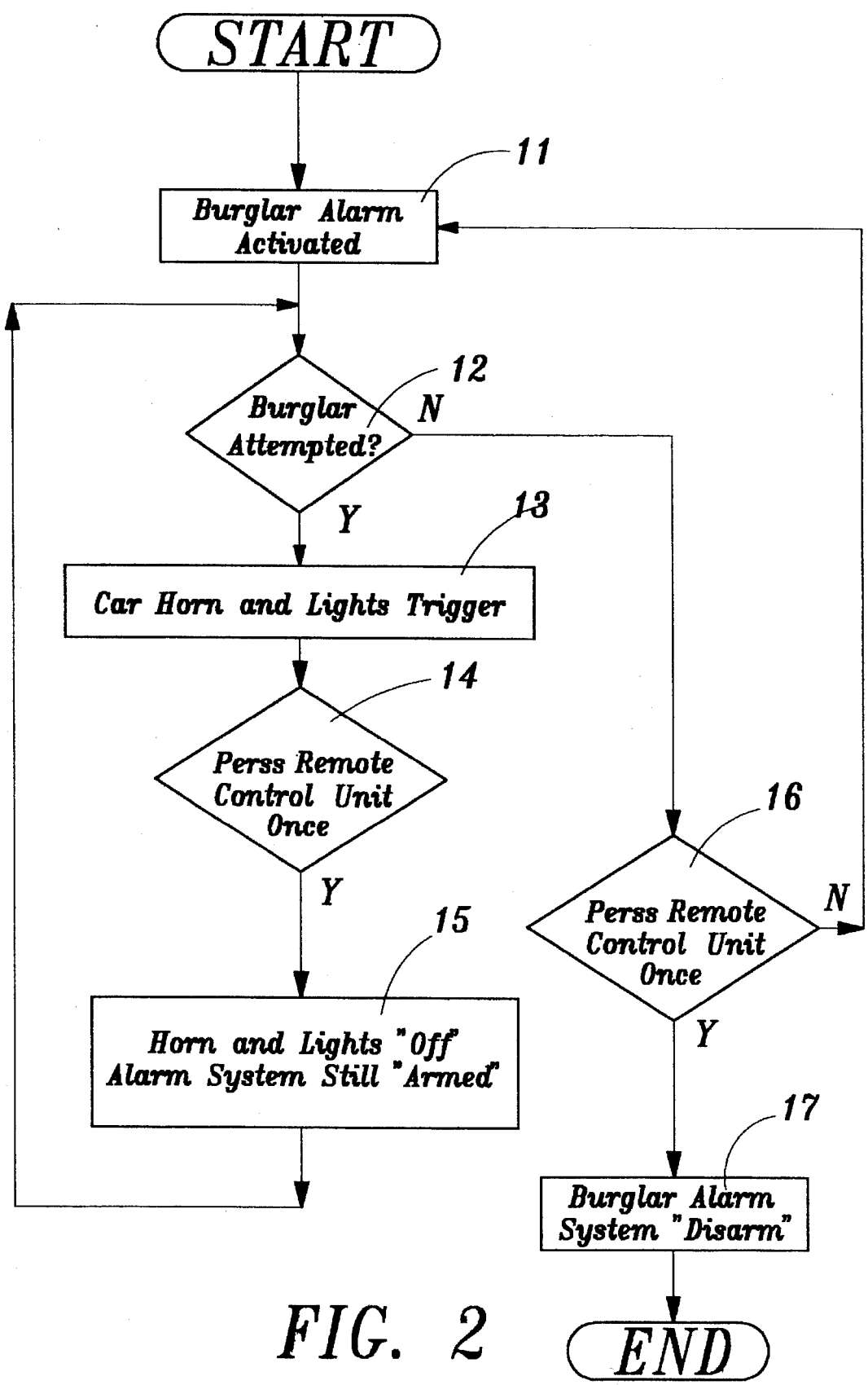
FIG. 2 is a flow chart showing the operation of the present invention.

Please refer to FIG. 2 for the flow chart which shows the operation of the alarm system. When the alarm system is fully armed (11), the doors, the windows, and the engine, etc. of the car are being monitored by the system itself (12). If a triggering signal is detected, the siren and the signal lights are activated to function (13) as warning signals. The siren makes a shrill noise to alert the people nearby and to scare off an intruder, and the car signal lights begin to flash. The car owner usually immediately shuts off the siren with a remote control unit so that the neighbors will not be bothered by the loud noise. Because the conventional alarm systems are fully or temporarily disarmed when the siren and the signal lights are turned off, a "blind phase" therefore exists until the vehicle is rearmed again or the car owner returns back to the vehicle. Thus, the vehicle could be stolen if the owner cannot get to the vehicle right away, or forget to arm the alarm via remote.

However, the alarm system of this new invention is different from the conventional systems. When the siren is triggered, the car owner can initiate the first stage of disarming (14) by activating the remote control unit to turn off the siren and the signal lights; the alarm system remains fully armed (15) and the engine is disabled. If the intruder gives up the attempt and the alarm is no more triggered, the vehicle is still being fully armed. If the alarm system is again triggered after the owner turns off the siren, the siren will make the shrill noise again to alert the car owner. If the alarm is never triggered since armed, the car owner can press the remote control unit once (16) to disarm the alarm system (17), and the signal lights will light for 30 seconds, as a car locator, for the convenience of the car owner.

Figure 3:
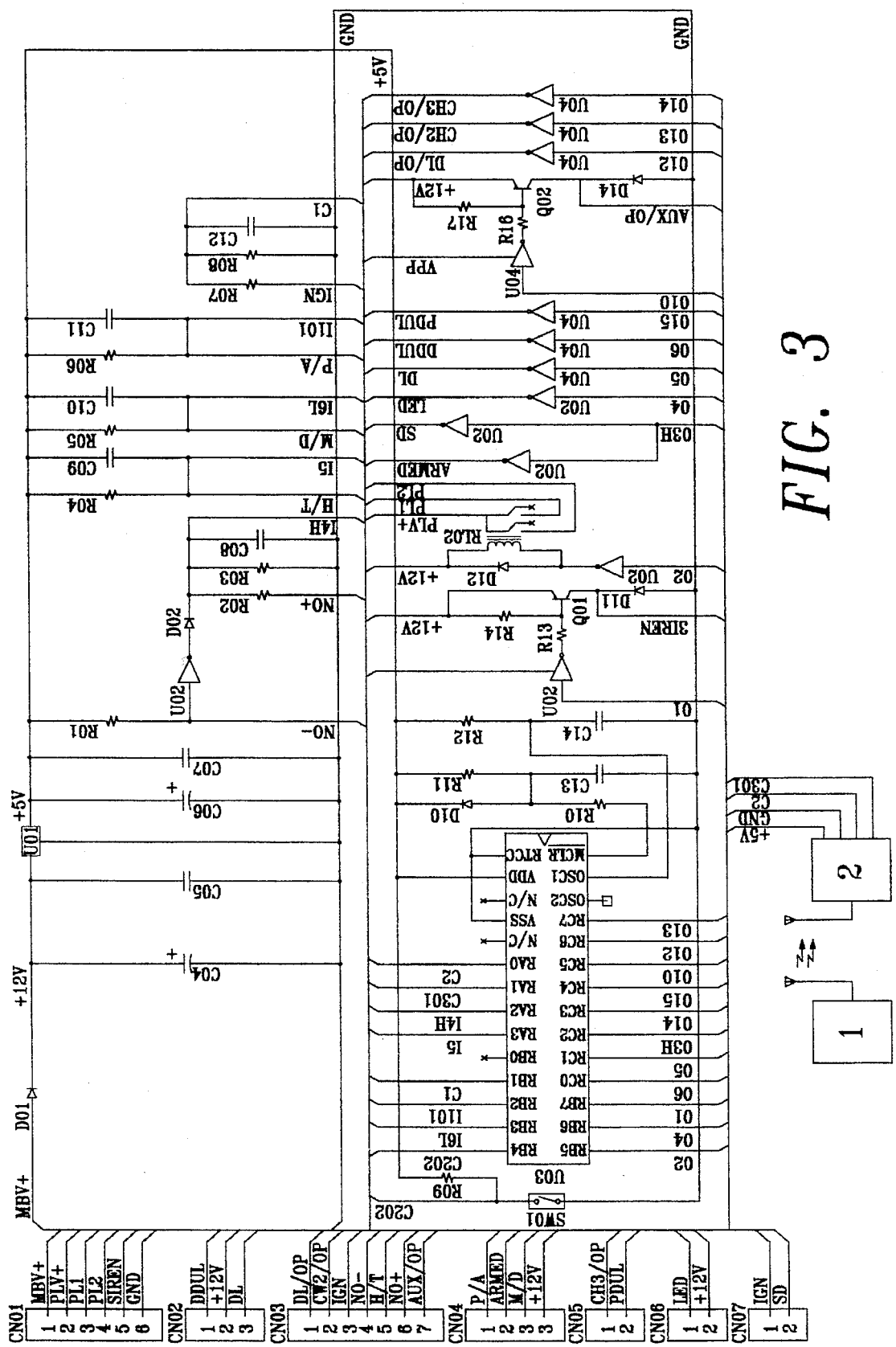
FIG. 3 is a circuit diagram of the alarm system.

Please refer to the FIG. 3 for the circuit diagram of the present invention. This circuitry utilizes a Central Processing Unit (CPU) U03 to control the overall operation of the alarm system. The operation in FIG. 2, which controls the different devices of CN01 through CN07, is part of the CPU. These devices include the siren, the signal lights, the door locks, the engine starter disabler, etc. A buffer amplifier unit consisting of inverters U02 and U04 is provided to drive the above device. The alarm is powered by the car battery which provides the power to U01, D01, and C04 through C07 to form a regulated 5-volt DC power supply. The signal lights of PL1 & PL2 are switched at relay RL02. When the alarm system is fully armed, the CPU, U03, continuously monitors the signals from the receiver-decoder unit (2) while it is detecting any triggering signal. If any triggering signal is detected, the siren sounds loudly and immediately and signal lights flash continuously so that a would-be intruder can be scared off. At this moment, the car owner can then press the remote control unit to turn off the siren and car signal lights, by which a signal is transmitted to the receiver-decoder unit (2) that decodes the signal and sends it through C301 to the CPU(U03). The CPU then turns off siren and car signal lights while it is monitoring other triggering signals. However, the siren and the signal lights will sound and flash respectively again if the burglar continues his attempt to steal the car. And, the engine will not be able to start unless the alarm system is disarmed by the remote control unit.

More important, this feature of two-stage disarming will prevent a burglar from stealing the car and the "blind phase" of an alarm system is therefore eliminated.

What is claimed is:

1. A two-stage disarming type vehicle alarm system comprising a remote control unit for arming and disarming the alarm system and for turning off a siren and signal lights installed in a vehicle from a remote location; a receiver-decoder unit for receiving and decoding of a signal from the remote control unit; a central processor unit (CPU) for processing of the decoded signal from the receiver-decoder unit and for controlling operations of the alarm system including control over door locks, engine start disabler, said siren and signal lights and an amplifier for amplification of the signals from the CPU which are then fed to said door locks, engine start disabler, siren, and signal lights, wherein:

the signals from the receiver-decoder unit are monitored by the CPU continuously;

when the alarm system is armed, and when there is no attempt to break-into the vehicle, a single activation of the remote control unit by a person sends a single triggering signal to the receiver-decoder unit which decodes and transfers the signal to the CPU to disarm the alarm system;

wherein the system includes means for sensing attempted break-into the vehicle and outputting a triggering signal; when the alarm is armed, and when there is an attempt to break into the vehicle indicated by said triggering signal detected by the CPU, a single activation of the remote control unit only stops the sounding of the siren and the flashing of the parking lights of the vehicle but the alarm is still armed;

another attempt to break into the vehicle indicated by a triggering signal detected by the CPU again triggers the alarm and make the siren sound as well as the parking lights flash;

and the alarm is completely disarmed if the siren is emitting sound and the parking lights are flashing, when the vehicle owner activates the remote control twice consecutively.

* * * * *